United States Patent

[11] 3,605,038

[72] Inventors Francis T. Byrne;
Carl F. Shelton, both of Silver Spring, Md.
[21] Appl. No. 33,411
[22] Filed Apr. 30, 1970
[45] Patented Sept. 14, 1971
[73] Assignee International Business Machine Corporation
Armonk, N.Y.

[54] POPULATION INVERSION AND GAIN IN MOLECULAR GASES EXCITED BY VIBRATIONALLY EXCITED HYDROGEN
12 Claims, 6 Drawing Figs.
[52] U.S. Cl. .................................................. 331/94.5
[51] Int. Cl. .................................................. H01s 3/09
[50] Field of Search ...................................... 331/94.5

[56] References Cited
UNITED STATES PATENTS
3,393,372  7/1968  Vickery et al. .............. 331/94.5
3,464,028  8/1969  Moeller ....................... 331/94.5
3,510,797  5/1970  Nieuwpoort et al. ........ 331/94.5

OTHER REFERENCES
Patel: J. Chim. Phys., Vol. 64, pp 82–92, Jan., 1967
Rosenberger: Physics Letters, Vol. 21, pp. 520–521, June, 1966
Whitteman et al: Physics Letters, Vol. 26A, pp. 454–455, April, 1968

Primary Examiner—William L. Sikes
Assistant Examiner—Edward S. Bauer
Attorneys—Hanifin and Jancin and Maurice H. Klitzman ABSTRACT: Population inversion and optical gain is obtained from a gaseous mixture which includes vibrationally excited hydrogen, helium, and a polyatomic molecular gas which has a resonant energy level near the first vibrational energy level of hydrogen, and which has allowed transitions to an intermediate vibrational level lying between the resonant level and the ground state.

Coherent infrared emission is observed when the gaseous system is excited in a laser system.

INVENTORS
FRANCIS T. BYRNE
CARL F. SHELTON

BY *Maurice H. Klitzman*
ATTORNEY

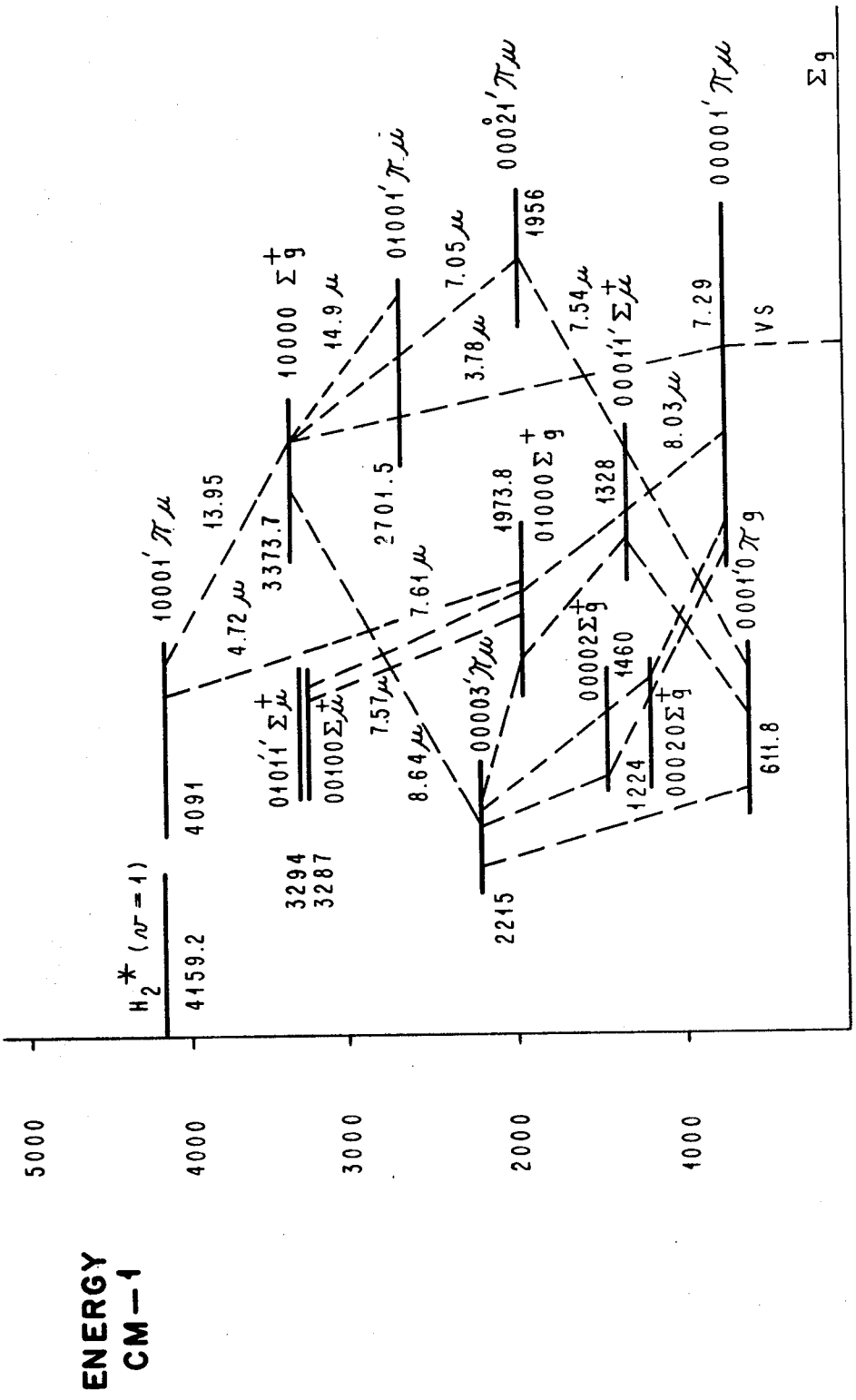

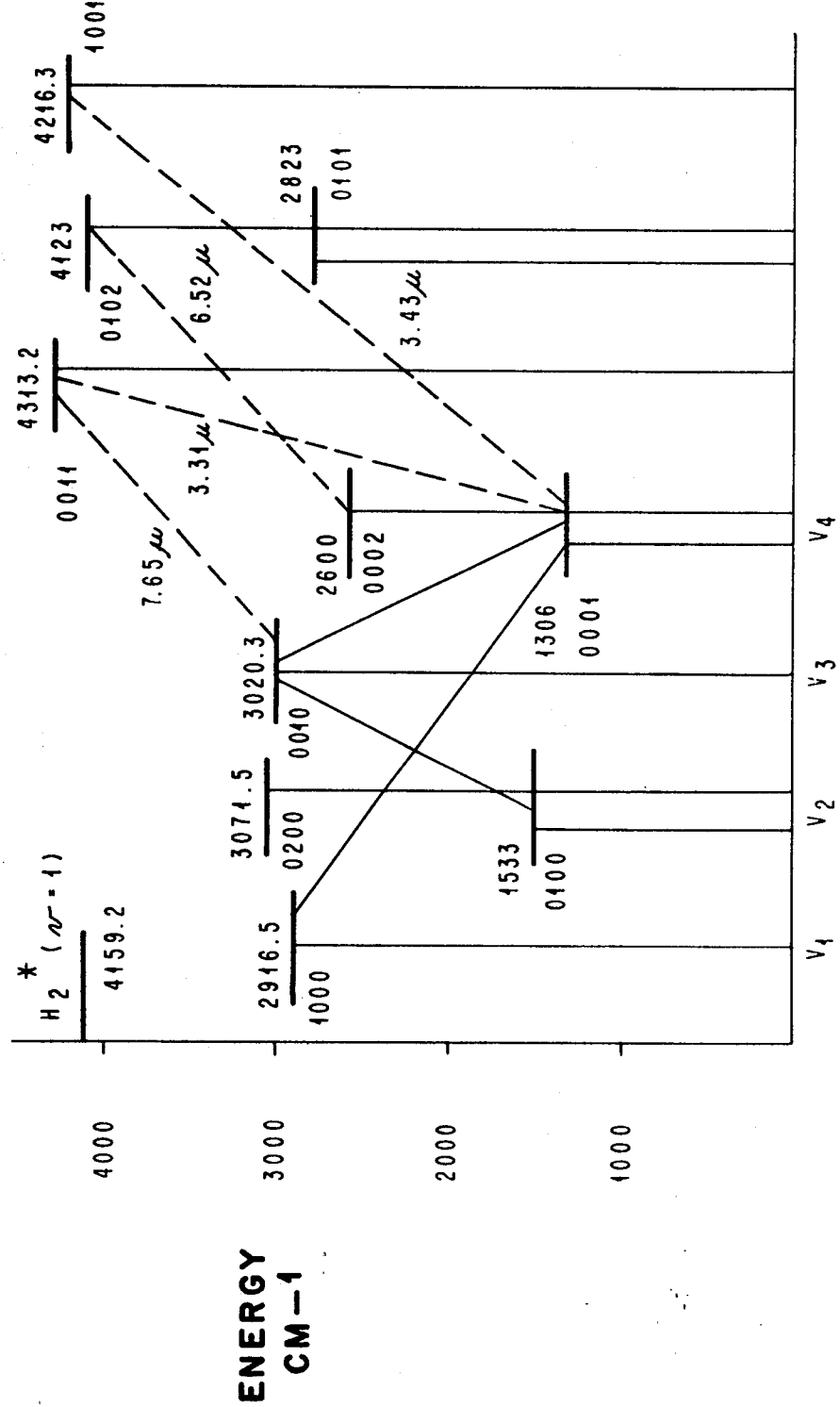
FIG. 5 VIBRATIONAL ENERGY LEVEL DIAGRAM OF METHANE — CH₄

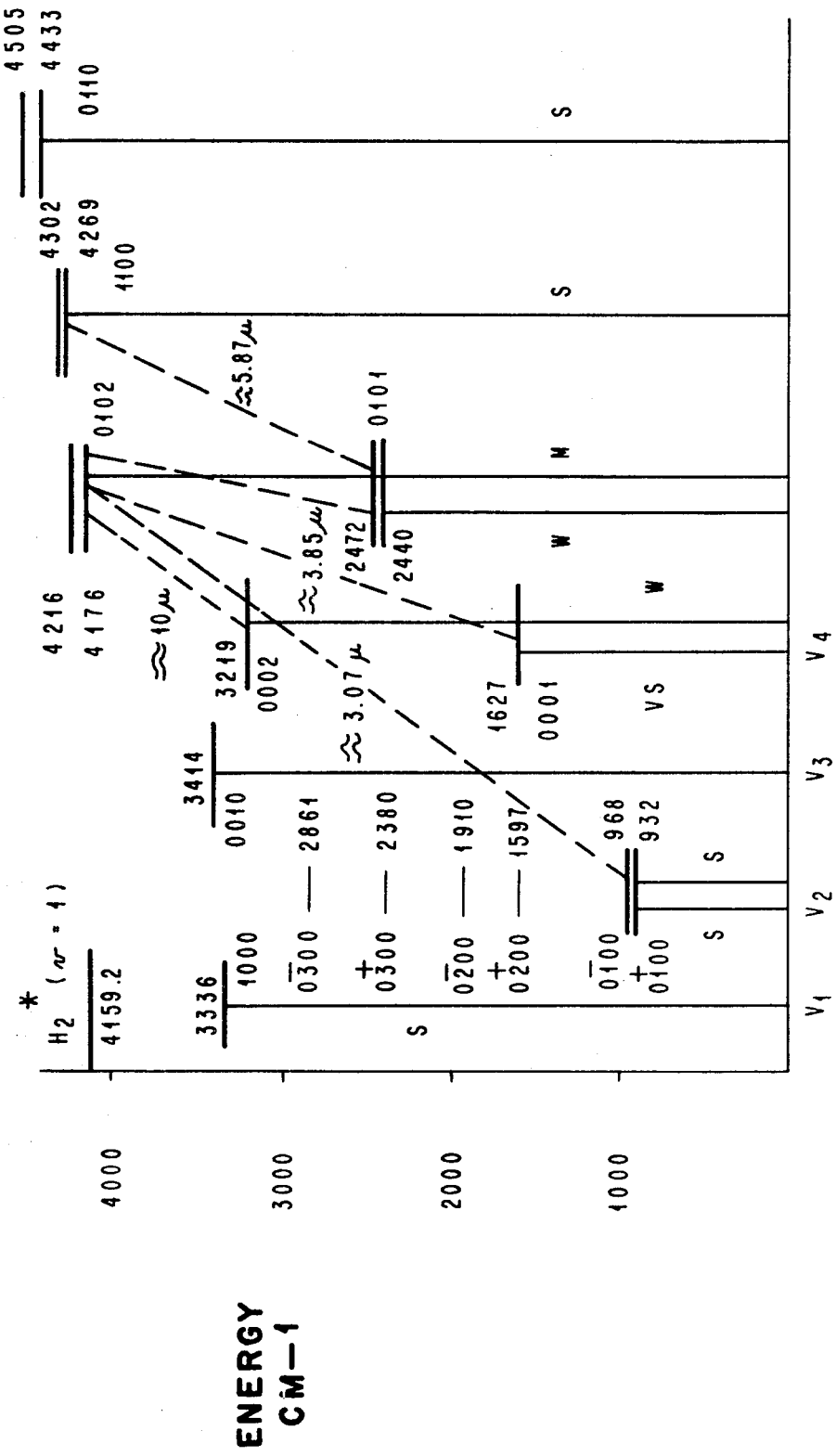
FIG. 6 VIBRATIONAL ENERGY LEVEL DIAGRAM OF AMMONIA — NH₃

POPULATION INVERSION AND GAIN IN MOLECULAR GASES EXCITED BY VIBRATIONALLY EXCITED HYDROGEN

BACKGROUND OF THE INVENTION

This invention relates to infrared lasers in which a polyatomic molecular gas is employed as the active constituent in the laser medium. In particular, this invention concerns the use of the metastable state of a diatomic molecule to induce population inversion and optical gain in polyatomic molecular gases.

The energy level spectra of molecular gases are much more complex than those of atomic gases. A polyatomic molecule, even when in the electronic ground state, has mechanisms which store energy and which may be excited. There are two such mechanisms known: vibration according to a periodic motion and rotation about the molecule's center of mass. These vibrational and rotation energies exist in certain well-defined states, analogous to the discrete states of the electron orbits of atoms. In the simplest structure, a diatomic molecule, several approximately equally spaced vibrational levels exist; for each of these levels, there are a number of rotational levels. This accounts for the very complicated energy level diagrams of molecular gases. As in the electronic levels of atoms, the higher vibrational energy levels of molecules are ordinarily less populated than the lower vibrational energy levels. To achieve laser emission, the population of these levels must be reversed, i.e., population inversion must first be caused to occur.

C. K. N. Patel was apparently the first person to demonstrate vibrational level inversion in carbon dioxide in his article in *Physical Review Letters*, Nov. 23, 1964, p. 617. Soon thereafter, Patel showed that nitrogen in its metastable vibrational level ($v=1$) could be used to selectively populate an upper level of carbon dioxide through resonant transfer via inelastic collisions. The 001 level of carbon dioxide is nearly resonant with the $v=1$ level of nitrogen. Laser emission near 10.6 microns was observed. Since that discovery, carbon dioxide lasers have been developed which emit coherent radiation with enormous power. Perhaps the most notable achievement has been a $CO_2$ laser which is one meter long and has a continuous output of one kilowatt. Continuous output power of 8.8 kw. has been obtained from $CO_2$ lasers of much greater length and still greater power is theoretically achievable. Patel and others have also demonstrated that $CS_2$ and $N_2O$ will yield laser emission around 10 microns when excited by vibrationally excited $N_2$.

A polyatomic molecular gas laser which will efficiently emit radiation in the region below 10 microns has been sought after. An $N_2$-CO laser which generates radiation at a wavelength about 5 microns has been demonstrated. However, it operates most efficiently at the temperature of liquid nitrogen; at room temperature this laser is inefficient and thus has not found wide application.

The use of a diatomic gas which has a higher quantum of energy in its metastable first vibrational level than nitrogen has been suggested by others in this art. It appeared that the diatomic molecule hydrogen with an energy level of 4159.2 cm.[11] (2.41 microns) in its metastable first vibrational level could be used to excite a polyatomic molecule which has an upper vibrational level which is nearly resonant with that of hydrogen (around 4160 cm.[11]). Similar to $N_2$, the $v=1$ level of $H_2$ at 4159.2 cm[11] has no permanent dipole moment with respect to the $v=0$ level. Thus, the $v=1$ level of $H_2$ is metastable and cannot relax via radiative transitions. The sole depopulation mechanism from the $v=1$ to the $v=0$ level is through inelastic collisions with other molecules or the walls of the enclosing container or envelope. In addition, the cross section for excitation of the vibrational mode of $H_2$ by electron impact in a low pressure gas had been measured.

Because of this prior word by others in the field, the following reactions were expected:

(1) $H_2(v=0) + e \rightarrow H_2^*(v=1) + e$ where $H_2^*(v=1)$ represents the first vibrational energy level of $H_2$ in the electronic ground state.

(2) $H_2^*(v=1) + M \rightarrow H_2(v=0) + M^* = \Delta E$ where $H_2^*(v=1)$ is as explained above, $M^*$ represents the vibrational level of the M polyatomic molecule which is nearly resonant with the $H_2^*(v=1)$ energy level and $\Delta E$ is the energy difference between the $H_2^*$ and $M^*$ energy levels.

(3) $M^* \rightarrow M + h\nu_{laser}$ where $\nu_{laser}$ is the frequency radiated when the $M^*$ molecule drops to a lower energy level.

However, attempts to achieve population inversion and optical gain with $H_2$-polyatomic molecule systems have been unsuccessful. In one reported series of experiments, gases of $H_2O$, $NH_3$, HCN, and $CH_4$ were tested. Each of these molecules has an upper vibrational level which is nearly resonant with the first vibrational level of $H_2$ in its ground electronic state [$H_2^*(v=1)$] and has allowed transitions to a level intermediate between the upper level and the ground state. The oscillator apparatus used was similar to that used by Patel in achieving emission in his $N_2$-$CO_2$. No laser emission was observed for any mixture. In an independent series of experiments, the present inventors attempted to excite $NH_3$, $C_2H_2$, $CH_4$, $C_2H_4$, and $C_2H_6$ with $H_2$. No laser emission was observed. The apparent reason for this failure is the inability to excite the hydrogen from its ground state $H_2(v=0)$ to its first vibrational level $H^*(v=1)$.

SUMMARY OF THE INVENTION

It is therefore an object of this invention to obtain population inversion and gain from a molecular gas by exciting the gas with a vibrationally excited diatomic molecule which has metastable vibrational levels higher than those of nitrogen.

It is a further object of this invention to provide an infrared molecular gas laser which emits radiation at wave lengths in the region below 10 microns.

These and other objects are achieved by vibrationally exciting hydrogen to overpopulate a near-resonant upper vibrational level of a polyatomic molecule. The molecule is a polyatomic gas having an upper energy level which is nearly resonant with the first vibrational level of hydrogen and which has allowed transitions to an intermediate level lying between the resonant level and the ground state. Helium must be added to the mixture. The addition of helium allows one to adjust the electron temperature and the electron density of the gaseous mixture. This shifts the energy distribution of the electrons to more favorable values for exciting by electron impact the vibrational levels of hydrogen. Successful emission occurs only after helium is added to the hydrogen-polyatomic molecule mixture and the pressure of the gases is adjusted so that the energy distribution of the electrons are most favorable to exciting the $H_2$ to its $H_2^*(v=1)$ level.

Gases such as helium, xenon, and neon had previously been added to a $N_2$-$CO_2$ laser to increase the power output. The effect of these gases is to redistribute the rotational distribution of the upper and lower transition levels of the $CO_2$. This prevents the depletion of the upper rotational level of the $CO_2$ and speeds up the depletion of the lower rotational level. See, e.g., "Effects of $CO_2$, He, and $N_2$ on the Lifetimes... of $CO_2$ Laser Levels...," P. K. Cheo, *J. Appl. Phys.*, Vol. 38, 09, 1967, pp. 3563–3567. It has also been hypothesized that collisions between He atoms and $CO_2$ molecules tend to thermalize the rotational levels of the excited $CO_2$ molecules. See "High Power Laser Action in $CO_2$-He Mixtures," Moeller et al., *Appl. Phys. Lett.*, Vol. 7, 010, 1965, pp. 274–276. Unlike the present invention, these gases have no discernible effect on the $N_2$ in a $N_2$-$CO_2$ laser. This is demonstrated by the fact that xenon, which increases the output of a $N_2$-$CO_2$ laser, has a lower ionization potential than $N_2$. Hence, it is not capable of increasing the electron temperature in the $N_2$-$CO_2$ gas as He does in the $H_2$ mixture of the present invention.

The invention will be more fully understood by referring to the following detailed description taken in connection with the accompanying drawings, forming a part thereof, in which:

FIG. 3 is a simplified energy level diagram of acetylene ($C_2H_2$).

FIGS. 5 and 6 are simplified energy level diagrams of methane ($CH_4$) and ammonia ($NH_3$) respectively.

Figure 1:
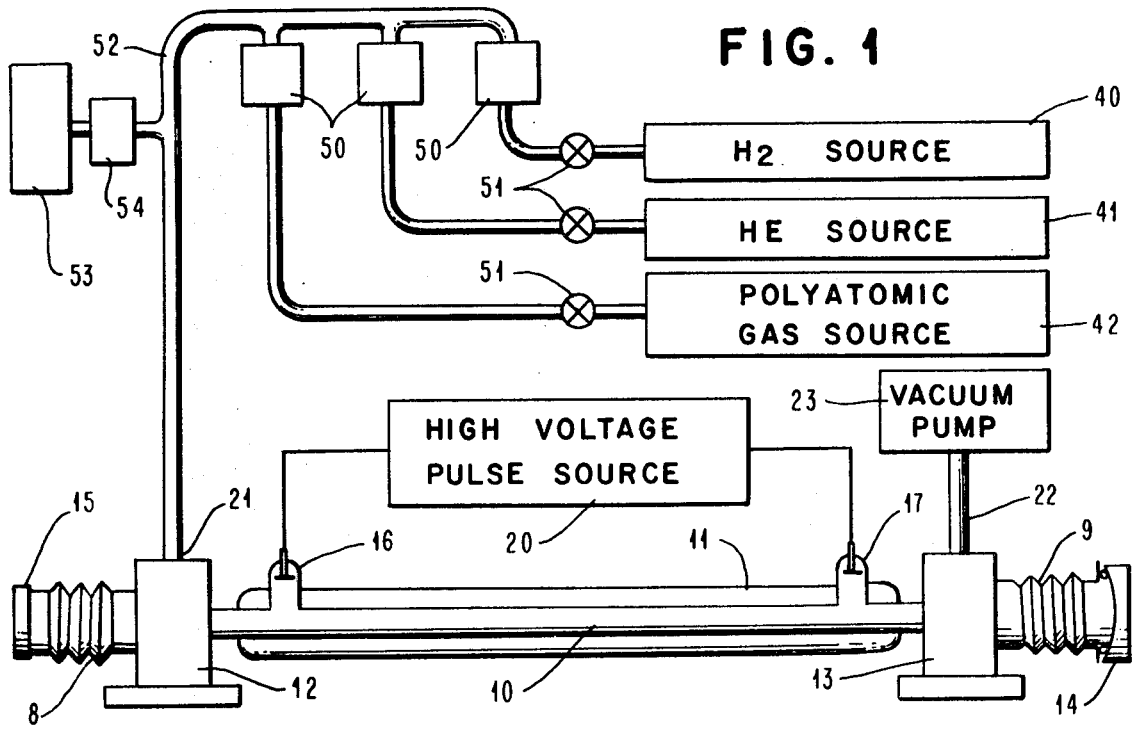
FIG. 1 is a simplified schematic representation of a coherent light generator containing the gaseous mixtures of the present invention.

Referring now to FIG. 1 of the drawing, there is shown an envelope 10 filled with the gaseous mixture of this invention. Envelope 10 may be a tube fabricated of glass with a length of several inches to several feet, depending on the output power desired. The diameter of the envelope may vary from fractions of an inch to several inches. In one embodiment of the invention, the inner diameter of envelope 10 was one-half inch and the length was 1.4 meters. Jacket 11 surrounds envelope 10 for cooling purposes. It may contain any number of coolants, such as water or liquefied gases, depending upon the desired temperature of the gaseous mixture. The envelope is supported between supports 12, and 13. Reflectors 14 and 15 are used to define an optically resonant cavity. The reflectors may be plane-parallel, semiconfocal, confocal, or concentric. To achieve exact alignment, which is critical, stainless steel bellows 8 and 9 are used to allow alignment of the reflectors. In the present embodiment, both reflectors are highly reflective, broadband mirrors. Reflector 14 is a gold-coated mirror with a radius of curvature of 5 meters; reflector 15 is a flat, gold-coated $BaF_2$ crystal with a hole of 1/2 mm. diameter in the gold coating. The hole allows a small fraction of the energy inside the resonant optical cavity formed by reflectors 14 and 15 to be coupled out of the cavity. It will be understood by those of skill in this field that the reflectors may also be of the narrow band type, selected to reflect only a chosen wavelength.

Figure 2:
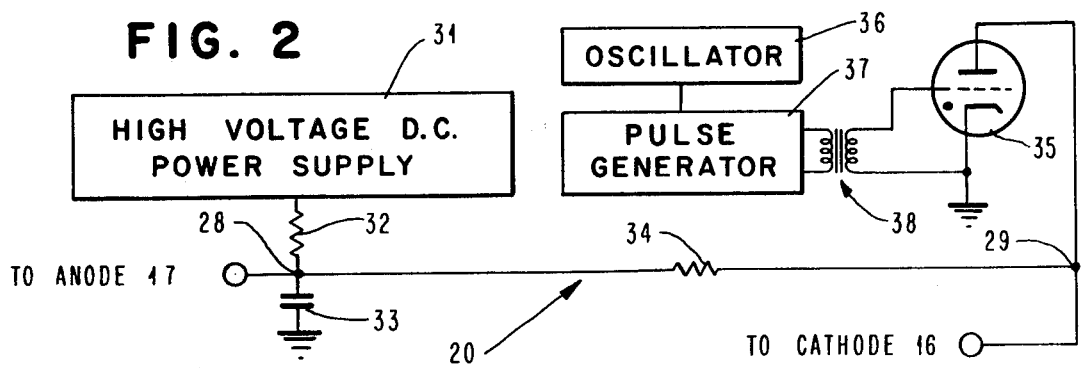
FIG. 2 is the circuit used for providing pulsed excitation of the gaseous mixtures in block diagram form.

Means for producing electrical current pulses within envelope 10, thereby exciting the mixture, comprise cathode 16, anode 17 and high voltage pulse source 20. The apparatus and operation of pulse source 20 will be discussed at greater length in a succeeding secton of this application in conjunction with FIG. 2. Free electrons are the initial excitation mechanism in the system and are supplied by cathode 16 and by ionization of the gases within envelope 10. Both the cathode and anode may be composed of stainless steel, nickel, tungsten, or other suitable material. In the preferred embodiment, the cathode and anode are nickel.

A continuous flow of gases comprising the lasing medium is provided through plasma envelope 10 by means of a gas inlet 21 and gas outlet 22 which is connected to vacuum pump 23. Sources of hydrogen, helium, and the polyatomic gas 40, 41, and 42, respectively, are connected to gas inlet 21 through suitable flow meters 50, needles valves 51, and tubing 52. Each flow meter and associated needle valve control the partial pressure and flow rate of its associated gas. A capacitor-manometer pressure head 54 connected to tubing 52 measures the total partial pressure of the gases before they enter discharge envelope 10. Meter 53 converts the pressure head measurement into an electrical readout. Laser emission through the aperture in reflector 15 may be sensed by any of a number of commercially available detectors (not shown), such as a Ge-Au detector.

The high voltage pulse source 20 shown in FIG. 1 may comprise several different forms. The preferred embodiment, shown in FIG. 2, comprises a high voltage DC power supply 31 connected to a resistor-capacitor combination 32, 33. The terminal point 28 between resistor 32 and capacitor 33 is connected to anode 17 and one side of resistor 34. The terminal point 29 of resistor 34 opposite anode 17 is connected to cathode 16 and the plate of thyratron 35. Oscillator 36 and pulse generator 37 are employed through transformer 38 to repetitively operate thyratron 35. In the operation of one embodiment of this invention, supply 31 provided is a voltage of 10 kilovolts through resistor 32 to charge capacitor 33. The value of power supply 31 is chosen to exceed the breakdown potential of the gas in envelope 10. This potential is dependent on the particular gas mixture used and the pressure of the gas within envelope 10. Resistor 32 and capacitor 33 have values of 150 kilohms and 0.02 microfarads. respectively. Resistor 34 has a value of 1 megohm. Oscillator 36 is operated at varying rates between 1 and 250 Hz. to repetitively switch thyratron 35 at the same rate. With the thyratron turned on, plate 35 and cathode 16 are effectively at or near ground potential. This causes the charge stored in capacitor 33 to be released across the envelope 10 in FIG. 1 between anode 17 and cathode 16. It will be recognized by those of skill in the art that the design and construction of the high voltage pulse source are not inventive Moreover, AC DC or R.F. excitation rather than pulsed excitation have been used successfully for other molecular gas lasers. However, the higher excitation power available from a short pulse makes pulsed excitation more favorable.

It will be recognized that the total energy of the pulse must be low enough not to dissociate the gas and high enough to vibrationally excite the gas. In the preferred embodiment of this invention the energy of the pulse was about 1 joule.

In the preferred embodiment of this invention population inversion and optical gain has been achieved using a flowing mixture of $H_2$-$C_2H_2$-He. Laser emission has been observed using the apparatus described in FIGS. 1 and 2. As will be further discussed, acetylene ($C_2H_2$) has the greatest number of possible laser transitions of those molecules which are known to have vibrational energy levels nearly resonant with the $H_2^*(v=)$ energy level.

Acetylene is a linear symmetric molecule with the configuration H—C≡C—H. For this system, there are five normal modes of vibration, designated by the standard notation $v_1...,v_5$. The notation $\Sigma g^+$, $\Sigma u^+$, $\pi g$, and $\pi \mu$ suffixed to the vibrational modes represent the species or symmetry types of the normal vibrations. The last two vibrational modes are degenerate bending modes, denoted by superscripts. Those interested in a more complete explanation of this notation should consult Herzberg, *Infrared and Raman Spectra*, D. Van-Nostrand & Co., 1945. The pertinent vibrational levels of $C_2H_2$ are shown in FIG. 3 to which reference is now made.

FIG. 3 is a much simplified vibrational energy level diagram of $C_2H_2$. It will be seen that the $10001^1$ level at 4091 cm.[11] is at near resonance with the $H_2^*(v=1)$ level at 4159.2 cm.[11], and the possibility of resonant vibrational energy transfer via an inelastic collision exists as shown by the formula:

(4)  $H_2^*(v=1) + C_2H_2(\overline{0000°0°}) \rightarrow \overline{H}_2(v=0)$ $+ C_2H_2^*(10001^1) + \Delta E \cong 68.2$ cm$^{-1}$ where $\overline{0000°0°}$ represents the ground vibrational level and $10001^1$ is at 4091 cm.[11]. An acetylene molecule in the $10001^1$ $\pi \mu$ level could then decay radiatively to 10000 $\Sigma g^+$ level at 3373.7 cm.[11], satisfying the $u \leftarrow \rightarrow g$ selection rule. Because the 10000 $\Sigma g^+$ level is then in close Fermi resonance with both the $0101^11^1 \Sigma \mu^+$ and $00100 \Sigma \mu^+$ levels at around 3290 cm.[11], a rapid exchange of energy might occur even though the $u \leftarrow \rightarrow g$ selection rule is violated. The molecule may decay from any of these three levels, 10000 $\Sigma g^+$, $0101^11^1 \Sigma \mu^+$ and $00100 \Sigma \mu^+$, by allowed $u \leftarrow \rightarrow g$ transitions. The decay transitions to lower energy levels are indicated by the dotted lines and the radiation which would be emitted is given in units of microns alongside the dotted lines in FIG. 3. For example, a decay from the 10000 $\Sigma g^+$ level to the $01001^1$ $\pi \mu$ level would result in the emission of radiation of 14.9 microns.

The $0002°1$ $\pi \mu$ and $01000 \Sigma g^+$ levels are also in close Fermi resonance and may rapidly exchange their energies. Some of the allowed vibrational transitions for the acetylene molecule are given in table I. It should be noted that the energies given in table I are only the vibrational energy level differences for the transitions specified and do not include rotational levels. Because the molecules in each vibrational state are distributed according to Boltzmann's distribution, the actual energy level differences can be calculated precisely.

TABLE I.—TRANSITIONS OF $C_2H_2$

| Vibrational transition | Energy | Wavelength |
| --- | --- | --- |
| $10000^1\ \Pi_\mu \rightarrow 10000\ \Sigma^+$ | 717.0 cm.$^{-1}$ | 13.95$\mu$ |
| $10000\Sigma g^+ \rightarrow 00001^1\ \Pi_\mu$ | 2,642.5 cm.$^{-1}$ | 3.78$\mu$ |
| $10000\ \Sigma g^+ \rightarrow 01000^1\ \Pi_\mu$ | 672.2 cm.$^{-1}$ | 14.90$\mu$ |
| $10000\ \Sigma g^+ \rightarrow 0002^\circ 1^1\ \Pi_\mu$ | 1,417.7 cm.$^{-1}$ | 7.05$\mu$ |
| $00003^1\ \Pi_\mu \rightarrow 00010^1\ \Pi g$ | 1,603.2 cm.$^{-1}$ | 6.22$\mu$ |
| $0002^1 1^1\ \Pi_\mu \rightarrow 00010^1\ \Pi^-$ | 1,344.0 cm.$^{-1}$ | 7.45$\mu$ |
| $01011^1\ \Pi_\mu \rightarrow 01000\ \Sigma g^+$ | 1,320.2 cm.$^{-1}$ | 7.57$\mu$ |
| $00100\ \Sigma_\mu^+ \rightarrow 01000\ \Sigma g^+$ | 1,313.2 cm.$^{-1}$ | 7.61$\mu$ |
| $01000\ \Sigma g^+ \rightarrow 00.011^1\ \Pi_\mu$ | 1,244.7 cm.$^{-1}$ | 8.03$\mu$ |
| $10000\ \Sigma g^+ \rightarrow 00.03^1\ \Pi_\mu$ | 1,158.7 cm.$^{-1}$ | 8.64$\mu$ |
| $10001^1\ \Pi_\mu \rightarrow 01000\ \Sigma g^+$ | 2,117.2 cm.$^{-1}$ | 4.72$\mu$ |

As can be seen from the large number of allowed transitions in $C_2H_2$ shown in FIG. 3 and table I, selective population of the $10001_1$ vibrational level from resonant vibrational energy transfer from $H_2^*(v=1)$ offers many possibilities for new laser emission lines in the near infrared region of the spectrum.

Using the apparatus shown in FIG. 1, a $H_2$-$C_2H_2$-He mixture which was extremely rich in He was used as the lasing medium. Pulsed excitation, rather than DC excitation, from pulse source 20 was used because the electron density resulting from the former is at least an order of magnitude higher than the latter for the gas mixture used. Laser emission was observed at 8.04 microns on a single line with no rotational lines. A Jarrell-Ash model 1 meter Czerny-Turner spectrometer with a 98 groove/mm. IR grating blazed at 7 microns was used to measure the wavelength of the laser emission.

At a temperature of 300° K., emission was obtained from a flowing mixture of 2.0 torr $H_2$, 1.0 torr $C_2H_2$ and between 10.0 to 20.0 torr He. The He pressure was varied between 10 and 20 torr without affecting the laser emission. Attempts at achieving emission from a $C_2H_2$ plasma, a $C_2H_2$-He plasma or a $C_2H_2H_2$ plasma failed.

At a bath temperature of approximately 200° K., emission was obtained from a flowing mixture over a wider range of partial pressures: 1 to 2 torr $H_2$, 2 to 4 torr $C_2H_2$, and 10 to 20 torr He. In this demonstration the coolant in jacket 11 of FIG. 1 was maintained at 200° K. The temperature of the gas mixture within envelope 10 was not measured. The improvement in pressure ranges with lower temperatures is not unexpected. Cooling increases the rate at which the ground state of the molecules is depopulated.

Figure 4:
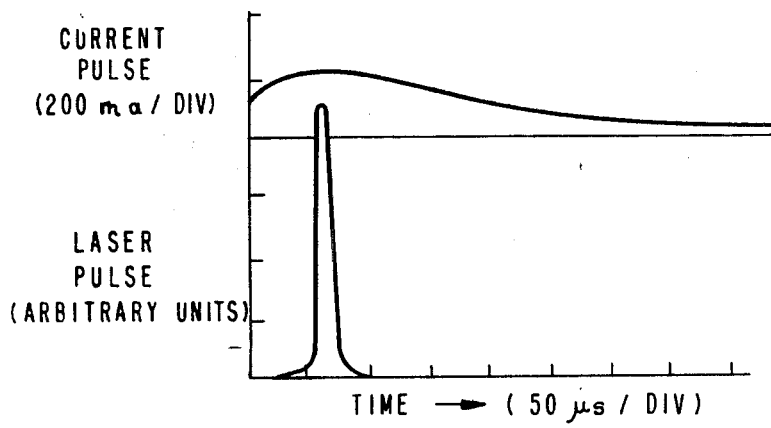
FIG. 4 is a tracing from an oscilloscope pattern showing the output of the laser system compared to the input current from the excitation source.

FIG. 4 of the drawing illustrates a single example of the results of this invention. FIG. 4 shows a combined graphical representation of a current pulse discharged through envelope 10 and a laser output pulse observed from a flowing mixture of 2.0 torr $H_2$, 1.0 torr $C_2H_2$, and 20 torr He at T=300° K. The current pulse is seen to average around 200 mA for around 200 microseconds. The total energy input is around 1 joule. The laser output pulse has a pulse width of around 25 microseconds and a peak power of 5.7 watts at 8.040±0.0012 microns. In this demonstration, laser emission was observed at current pulse repetition rates of from 1 p.p.s. to 250 p.p.s. from power source 20. There is a vibrational-rotational transition, the Q(12) line, on the 01000 $\Sigma_g^+$–00001$^1$ $\pi\mu$ band of $C_2H_2$ which has a calculated wavelength of 8.0404 microns. The theoretical normalized gain of this vibrational-rotational band peaks near Q(12) for small values of vibrational level inversion. Thus the laser emission appears to originate from the Q(12) line of the 01000 $\Sigma_g^+$–00001$^1\pi\mu$ band of $C_2H_2$. Assuming that this is so, the laser is then functioning as a classical four-level laser. As shown in FIG. 3, pumping takes place through a resonant vibrational energy transfer from the $v=1$ level of $H_2$ which has been excited by electron impact in the helium rich plasma:

(5) $\quad H_2(v=0)+e \rightarrow H_2^*(v=1)+e$

The excited hydrogen then vibrationally excites the acetylene from its ground state to its 10001$^1$ level by inelastic collisions:

(6) $\quad H_2^*(v=1)+C_2H_2(\overline{00000}) \rightarrow H_2(v=0)$
$\qquad +C_2H_2^*(10001^1)+\Delta E \cong 68.2$ cm.$^{-1}$ The $C_2H_2^*(10001^1)$ level can then make allowed transitions to the 01000 $\Sigma_g^+$ level which is the upper laser level.

The radiative transition occurs from the 01000 level to the 00001$^1$ $\pi\mu$ level:

(7) $\quad C_2H_2(01000) \rightarrow C_2H_2(00001)+h\nu_{laser}=8.040$ microns

The lower laser level, the 00001$^1\pi\mu$ level, then is depopulated through the strongly allowed 00001$^1\pi\mu$–00000 $\Sigma g$ transition.

This discovery may lead to laser emission at other wavelengths in $C_2H_2$ or other gases which have resonant vibrational energy levels with the $v=1$ level of $H_2$. With narrowband reflectivity mirrors, for example, laser emission near 4 microns might be produced on the 10000 $\Sigma_g^+$–00001$^1$ $\pi\mu$ band of $C_2H_2$. This would have a potential efficiency of about 65 percent (compared to 40 percent for the 10 micron $CO_2$ laser emission). The 8 micron line on the 01000 $\Sigma_g^+$–00001$^1$ $\pi\mu$ band, on the other hand, has a potential quantum efficiency of about 30 percent.

Referring now to FIG. 5, the vibrational energy level diagram of methane ($CH_4$) is shown. $CH_4$ has four normal modes of vibration, $v_1$, $v_2$, $v_3$, and $v_4$. The 0011, 0102, and 1001 levels are situated near the $H_2^*(v=1)$ energy level at 4159.2 cm.$^{11}$ The possible transitions which might result from selectively populating one of these levels are shown in FIG. 4 and are listed below in table 2.

TABLE 2.—TRANSITIONS OF $CH_4$

| Vibrational transition | Energy | Wavelength |
| --- | --- | --- |
| $0011 \rightarrow 0010$ | 1,292.9 cm.$^{-1}$ | 7.75$\mu$ |
| $0011 \rightarrow 0001$ | 3,007.0 cm.$^{-1}$ | 3.25$\mu$ |
| $0102 \rightarrow 0002$ | 1,523.0 cm.$^{-1}$ | 6.57$\mu$ |
| $0102 \rightarrow 0101$ | 1,300.0 cm.$^{-1}$ | 7.70$\mu$ |
| $1001 \rightarrow 1000$ | 1,299.8 cm.$^{-1}$ | 7.72$\mu$ |
| $1001 \rightarrow 0001$ | 2,910.1 cm.$^{-1}$ | 3.42$\mu$ |

Ammonia is a symmetrical pyramidal molecule with four normal modes. The vibrational energy levels of $NH_3$ are shown in FIG. 6. Some of the possible transitions resulting from vibrational energy transfer from $H_2$ are shown in FIG. 6 and listed in table 2. The 0102, 1100, and 0110 levels are all situated near the 4159.2 cm.$^{11}$ $H_2^*(v=1)$ level with the 4176 cm.$^{11}$ 0102 level having the nearest resonance. The two energy levels shown for each of these vibrational modes come about from the fact that the $v_2$ mode is split by inversion doubling where the N atom is moved through the $H_3$ plane to an equivalent position on the other side.

TABLE 3.— TRANSITIONS OF $NH_3$

| Vibrational transition | Energy | Wavelength |
| --- | --- | --- |
| $0102 \rightarrow 0100$ | 3,248 cm.$^{-1}$ | 3.07$\mu$ |
| $0102 \rightarrow 0001$ | 2,589 cm.$^{-1}$ | 3.85$\mu$ |
| $0102 \rightarrow 0002$ | 997 cm.$^{-1}$ | 10.00$\mu$ |
| $0102 \rightarrow 0101$ | 1,704 cm.$^{-1}$ | 5.87$\mu$ |

The ethylene molecule ($C_2H_4$) has twelve modes of vibration, $v_1...v_{12}$. The vibrational energies associated with each of these modes are given in Herzberg, supra, but because of the complexity of an energy level diagram, it will not be shown in the drawing. The $v_3+2v_7+v_{10}$ level at 4206.7 cm.$^{11}$ lies very close to the $H_2^*(v=1)$ level at 4159.2 cm.$^{11}$. Population of this level by resonant vibrational energy transfer may result in the transitions shown in table 4.

TABLE 4.—TRANSITIONS OF $C_2H_4$

| Vibrational transition | Energy | Wavelength |
| --- | --- | --- |
| $v_3+2v_7+v_{10} \rightarrow v_3$ | 2,865 cm.$^{-1}$ | 3.49$\mu$ |
| $v_3+2v_7+v_{10} \rightarrow 2v_7$ | 2,309 cm.$^{-1}$ | 4.33$\mu$ |
| $v_3+2v_7+V_{10} \rightarrow v_{10}$ | 3,212 cm.$^{-1}$ | 3.12$\mu$ |

In summary, the present invention has demonstrated that any polyatomic molecule with the following two characteristics is a candidate for laser emission:

1. it must have an energy level which is nearly resonant with the $H_2^*(v=1)$ level; and 2. it must have allowed transitions between the resonant level and the ground state.

Helium is added to establish the pressure and composition of the gas mixture at a level which yields an electron energy distribution which is favorable to vibrationally excite the $H_2$ molecules. Acetylene has been used as the preferred polyatomic gas because it has more possible transitions than any other gas known to have the above two characteristics.

While the invention has been particularly shown and described with reference to a preferred embodiment thereof, it will be understood by those skilled in the art that various changes in form and detail may be made therein without departing from the spirit and scope of the invention.

What is claimed is:

1. A laser for producing coherent infrared radiation comprising:
    a pair of spaced apart reflectors forming a resonant cavity for reflecting infrared radiation;
    an envelope disposed between the two mirrors;
    a gaseous mixture of hydrogen, helium, and a polyatomic molecule which has a resonant energy level near the vibrational energy level of the first metastable state of hydrogen, and which has allowed transitions between the resonant energy level and the ground state; and
    means for exciting the gas mixture by electrical energy to raise the hydrogen to its first metastable state, thereby to induce laser emission by vibrationally exciting the polyatomic molecule.

2. A laser as in claim 1 wherein the polyatomic gas is selected from the group consisting of acetylene, methane, ammonia, and ethylene.

3. A laser as in claim 1 wherein the means for exciting the gaseous mixture comprises pulsed excitation means.

4. A laser as in claim 1 further comprising:
    means for continuously flowing the gaseous mixture at selected partial pressures within the envelope; and
    cooling means for controlling the temperature of the gaseous mixture.

5. A laser as in claim 4 wherein the polyatomic gas is acetylene and the partial pressures of the hydrogen, acetylene, and helium have the following ranges, respectively: 2 to 4 torr, 1 to 2 torr, and 10 to 20 torr.

6. A laser as in claim 4 wherein the polyatomic gas is acetylene, the temperature of the cooling means is around 300° K. and the partial pressures of the hydrogen, acetylene, and helium are 2 torr, 1 torr, and between 10 and 20 torr, respectively, thereby to cause laser emission at 8.040 microns.

7. A laser as in claim 5 wherein the temperature of the cooling means is around 220° K., thereby to cause laser emission at 8.040 microns.

8. A method for inducing population inversion in an envelope containing a gaseous mixture of hydrogen, helium, and a polyatomic molecule which has a resonant energy level near the first metastable state of hydrogen and which has allowed transitions between the resonant energy level and the ground state comprising:
    exciting the gaseous mixture by electrical energy to raise the hydrogen to its first metastable state, thereby inducing population inversion by vibrationally exciting the polyatomic molecule.

9. A method as in claim 8 further comprising the steps of:
    continuously flowing the gaseous mixture within the envelope at selected partial pressures for each gas; and
    controlling the temperature of the envelope containing the gaseous mixture.

10. A method as in claim 9 wherein the polyatomic molecule is acetylene.

11. A method as in claim 10 wherein the selected partial pressures of the gases are: 2 torr, between 10 and 20 torr, and 1 torr for hydrogen, helium, and acetylene, respectively; and
    the temperature of the envelope is around 300° K.

12. A method as in claim 10 wherein the selected partial pressure of the gases are: between 2 to 4 torr, between 10 to 20 torr, and between 1 to 2 torr for hydrogen, helium, and acetylene, respectively, and
    the temperature of the envelope is around 220° K.

PO-1050
(5/69)

UNITED STATES PATENT OFFICE
CERTIFICATE OF CORRECTION

Patent No. 3,605,038 (33,411)     Dated September 14, 1971

Inventor(s) Francis T. Byrne and Carl F. Shelton

It is certified that error appears in the above-identified patent and that said Letters Patent are hereby corrected as shown below:

Column 4, lines 53, 55, 57, "4091 $cm^{11}$" should read --4091 $cm^{-1}$--
Column 4, line 32, "$H_2*(v=)$" should read --$H_2*(v=1)$--.

Column 5, line 30, "300'K" should read --300°K--.
Column 5, line 35, "$C_2H_2H_2$" should read --$C_2H_2 - H_2$--.

Column 6, line 3, "01000 level" should read --01000 $\Sigma_g^+$ level--.
Column 6, line 22, "4159.2 $cm^{11}$" should read --4159.2 $cm^{-1}$--.

Column 6, line 41, "4159.2 $cm^{11}$" and "4176 $cm^{11}$" should read --4159.2 $cm^{-1}$-- and --4176 $cm^{-1}$--, respectively.

Column 6, line 59 "4206.7 $cm^{11}$" should read --4206.7 $cm^{-1}$--.
Column 6, line 60 "4159.2 $cm^{11}$" shou d read --4159.2 $cm^{-1}$--.

In Table 4, that portion which reads "$v_3+2v_7+v_{10} \rightarrow v_{10}$" should read --$v_3+2v_7+v_{10} \rightarrow v_{10}$--.

Signed and sealed this 1st day of August 1972.

(SEAL)
Attest:

EDWARD M. FLETCHER, JR.
Attesting Officer

ROBERT GOTTSCHALK
Commissioner of Patents